United States Patent

[11] 3,596,592

| [72] | Inventors | Karl Trissnak, Dorfles near Coburg,<br>Kurt Siller, Coburg, both of Germany |
|---|---|---|
| [21] | Appl. No. | 808,972 |
| [22] | Filed | Mar. 20, 1969 |
| [45] | Patented | Aug. 3, 1971 |
| [73] | Assignee | Langenstein & Schemann<br>Aktiengesellschaft<br>Bayer, Germany |
| [32] | Priority | Mar. 20, 1968 |
| [33] | | Germany |
| [31] | | P 17 63 002.3 |

[54] CAPACITIVE DETECTOR FOR A RAM MOVABLE ON A FRAME
5 Claims, 2 Drawing Figs.

[52] U.S. Cl. ............................................. 100/99,
317/246, 324/61, 100/264, 100/269
[51] Int. Cl. ..................................................... B30 1/08
[50] Field of Search ........................................... 317/246,
249, 249 T; 324/61, 61 P; 100/99

[56] References Cited
UNITED STATES PATENTS

| 334,485 | 1/1886 | Stewart | 100/99 |
| 2,469,168 | 5/1949 | Loughlin | 317/249 X |
| 2,994,019 | 7/1961 | Frantz | 317/246 |
| 3,157,834 | 11/1964 | Kumm | 317/249 T |
| 3,222,591 | 12/1965 | Mynall | 324/61 S X |
| 3,239,730 | 3/1966 | Farago | 317/249 T |

OTHER REFERENCES

Folduari et al. Capacitive Transducers In Instruments & Controls Systems Nov. 1969 Vol. 37 Copy 324 61(p) pp 77, 79 (rt. col.) 80 pertinent

*Primary Examiner*—E. A. Goldberg
*Attorney*—Holman & Stern

ABSTRACT: A capacitive detector for a ram of a press hammer where a rod forms one electrode of the capacitor and the wall of a bore forms the other electrode of the capacitor, the rod and bore being arranged so that one can move with the ram and the other is joined to a stationary frame.

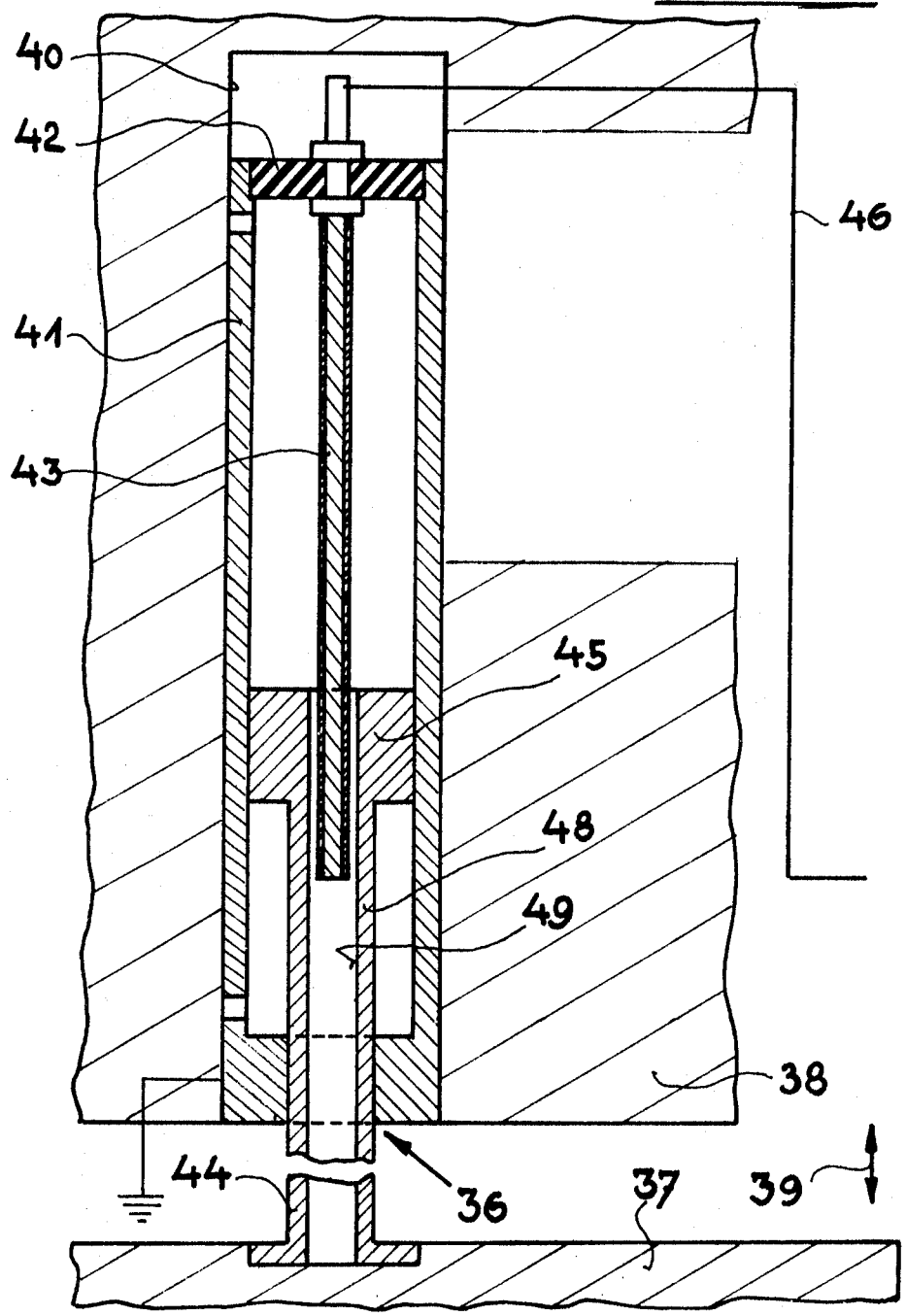

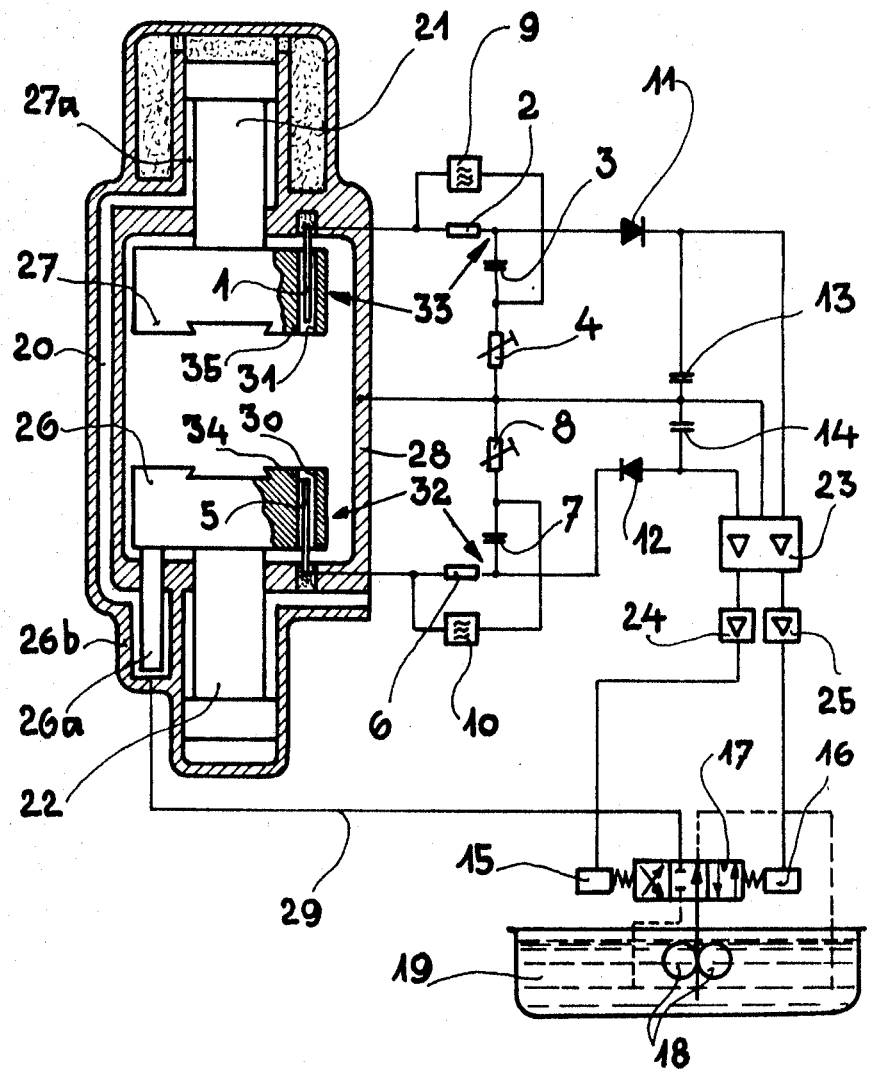
Fig:2

CAPACITIVE DETECTOR FOR A RAM MOVABLE ON A FRAME

The invention relates to a capacitive detector for a ram hammer or of a press apparatus, hereinafter called a press, the ram being movable on a frame.

The ram of the press is movable along a straight line and is mounted on the frame. In order to control the movement of the ram relative to the frame, electrical devices detecting or measuring the instantaneous position of the ram relative to the frame can be used. An electrical device of this kind is a capacitive detector, having two relatively movable electrodes.

A capacitive detector is already known for use on a machine table movable in a machine guide. In this known arrangement, the electrode provided on the movable machine table consists of a ratchet scale, extending in the direction of movement of the machine table and rigidly attached thereto. The electrode provided on the machine guide is a plate fastened to the guide. The plate and the ratchet scale are insulated from each other and are displaceable adjacent to each other. However, the application of this type of known detector to a ram movable on a frame meets with difficulties, because the operation of such a ram is considerably rougher than that of a machine table movable in a machine guide.

A capacitive scanner for measuring small variations in length is also known, in which scanner one of the electrodes is constituted by a wall of a bore which accommodates a short cylindrical piece acting as the second electrode, the second electrode being insulated from the wall forming the first electrode and displaceable therein. This capacitive scanner is a precision measuring instrument of complicated structure, and not suitable for measuring the movement of a ram or plunger movable on a frame.

The invention provides a capacitive detector of the type referred to at the outset, which detector is characterized in that the electrode provided on the ram is formed by the wall of a bore on the ram, into which there projects a fixed rod electrode insulatively mounted on the frame and extending in the direction of movement of the ram, and the electrode formed by the wall of the ram bore is slidable over the fixed rod electrode and is insulated therefrom.

In a detector according to the invention, the two electrodes are expediently arranged on the ram and frame sections located opposite each other. The rod is positioned more or less deeply into the bore and is protected thereby. The rod electrode and the wall electrode are arranged advantageously in the path of ram movement and not adjacent thereto. The wall electrode extending in the direction of movement of the ram defines a bore whose median axis extends within the area circumscribed by periphery. This arrangement of the detector is space saving, and the detector is also protected by the ram and the frame.

The capacity and capacity variations of the detector according to the invention are relatively great, so that the errors arising from rough operation have little influence on the measurements. The wall electrode may be conductively connected with the ram, so that insulation of the wall electrode relative to the frame and ram can be dispensed with, and the frame and ram conductively connected together to form one of the electrodes. It is therefore possible to have the terminals of the two electrodes located on stationary portions of the frame.

In a preferred embodiment of the detector according to the invention, the rod electrode is arranged so as to be freely projecting within a cavity in the frame, into which cavity there projects an annular piston mounted on the ram, and having a bore, thus constituting the wall electrode. In this embodiment, the rod of small cross section is protected in the cavity in the frame, while the annular piston which has a large cross-sectional area bore projects from the ram, into and around the frame.

According to a further modification, a cylindrical tube carrying the rod is inserted into the cavity in the frame, and the annular piston slides with its external surface along the internal surface of the cylindrical tube. In a detector of this kind, the annular piston and the cylindrical tube are conductively connected with each other by reason of their slinging contact.

The drawings show two nonlimiting embodiments of the invention; in which

FIG. 1 shows in cross section a capacitive detector for a ram movable on a frame; and FIG. 2 illustrates in cross section a further embodiment including a schematic electrical hookup.

In FIG. 1, a partly illustrated ram 37 of a press is movable to and fro relative to a partly illustrated frame 38 along a straight line in a direction shown by arrows 39. The two electrodes of the detector 36 are arranged on the rear face of the ram 37, on such parts of frame 38 and ram 37 which are located opposite each other.

To this end, the frame 38 has an oblong cavity 40 opening towards the ram 37, which cavity accommodates a cylindrical tube 41. The latter is closed at the top by an insulator plate 42 made of Teflon. In its center, the insulator plate 42 carries a rod electrode 43, which is hollow, externally smooth, and projects into the cylindrical tube 41, terminating at a distance from the bottom of the cylindrical tube. In a modification not here illustrated, the cylindrical tube is closed at the top by means of a steel lid, through which the rod is passed, insulated and pressuretight. The rod electrode 43 projects into an annular piston 44 having a wall 48 surrounding a bore 49.

The bottom of cylindrical tube 41 has a central aperture, in which the annular piston 44 is guided and is movable to and fro in the direction of arrows 39. During this movement, the annular piston 44 bears with its external surface against the rim of the bottom aperture in the cylindrical tube 41. On its end projecting into the cylindrical tube 41, the annular piston 44 has an enlarged section, whose external surface bears against the inner face of the cylindrical tube. That end of the annular piston 44 which protrudes from the cylindrical tube 41 is either rigidly or movably connected to the ram 37.

The length of rod electrode 43 and of the annular piston 44 approximately equals the length of the stroke of the ram 37 in the direction of movement referenced by arrows 39. The annular piston 44, the cylindrical tube 41, the frame 38 and the ram 37 are metallic a therefore electrically conductive. The rod electrode 43 has a metallic inner core surrounded by an insulating sheath, to prevent foreign bodies from influencing the switching precision. The rod electrode 43 projects with an endpiece through the insulator plate 42 beyond the end of the cylindrical tube 41. On this endpiece, an electrical connection 46 having the form of a screened cable is mounted. The electrical connection 46 leads to an amplifier not illustrated.

In a double-headed hammer or press according to FIG. 2, a lower tup 26 has a coupling piston 26a in a coupling cylinder 26b. The lower tup 26 can be lowered by means of an arming piston 22. The upper tup 27 has a coupling cylinder space 27a surrounding a working piston 21. The coupling piston 26a and the coupling cylinder chamber 27a are interconnected by a coupling conduit 20. The whole of the coupling system is connected through a control conduit 29 with a valve device 17 constructed as a slide valve, which in turn can be fed with liquid from a tank 19 by means of a pump 18. The valve device 17 can be set by means of an electromagnet 15 to "filling" and by means of an electromagnet 16 to "draining" positions.

With each tup 26, 27 there is associated a capacitive detector 32 and 33 respectively with a bridge, which in each case comprises in one arm a fixed ohmic resistance 6 or 2 respectively, in the arm opposite thereto a calibration resistance 8 or 4, in one arm a capacitor 7 or 3 and in the opposite arm a reactance dependent of the position of the tup. Each bridge is fed from a HF generator 10 or 9 respectively, and is connected to earth with the junction between the calibration resistance 8 or 4 and the tup-dependent reactance on the frame 28 of the double-headed hammer.

The mass-related detector voltage appearing at the output of each bridge is fed for rectification to a rectifier consisting of a diode 12 or 11 and a smoothing capacitor 14 or 13 respectively. The rectified detector voltages are fed to a high-ohmic differential DC voltage amplifier 23. Depending on the polarity of the detector-voltage difference, one of two power amplifiers 24, 25 in series with the amplifier 23, which power amplifiers in turn move one of the two electromagnets 15, 16 which actuate the valve device 17. At equal detector voltages none of the electromagnets will be actuated.

The reactance dependent of the position of the tups 26, 27 has capacitive properties and is formed by a bar or rod electrode 5 or 1 mounted with insulation on the frame 28 of the double-headed hammer, which bar or rod, extending in the direction of the stroke, projects into a bore 30 or 31 of one of the tups 26 or 27. The rod electrode 5 or 1 and the wall electrode 34 or 35 of the bore 30 or 31 respectively constitute in each case the electrodes of a capacitor. When the two tups move towards one another, the capacitance of these capacitors diminishes.

We claim:

1. A press having at least one ram movably mounted on a frame and means for actuating said ram, the improvement comprising a capacitive detector for determining the position of said ram relative to said frame, said detector comprising two electrodes and electrical connections to indicator means, the first electrode being the wall defining a bore which is on the back face of said ram, the second electrode being a smooth rod insulatively fixed to said frame and having an axis parallel to said bore, said second electrode being so positioned and the relative size of said two electrodes being such that when the back face of said ram approaches said frame, said second electrode continues down the bore of said first electrode thereby changing the capacitance of said detector which is registered by said indicating means.

2. A press as claimed in claim 1 wherein the bore is a cavity in the back face of said ram and second electrode projects from said frame.

3. A press as claimed in claim 1 wherein said first electrode is in the form of an annular piston projecting from the back of said ram, said second electrode being positioned coaxially within a cavity in said frame.

4. A press as claimed in claim 3 wherein said second electrode is insulatively fixedly mounted at the bottom of a cylindrical tube positioned in said cavity, said second electrode being coaxial with said cylindrical tube and spaced from the inner wall thereof, and said annular piston being so dimensioned as to linearly slide along said coaxial axis in said space between said second electrode and inner wall.

5. A press as claimed in claim 2 wherein the press has two counteracting rams and each ram is actuated by a piston and cylinder arrangement, a passageway for liquid interconnecting the cylinders of each piston, a capacitive detector for each ram, and a valve device connecting passages from each cylinder to a liquid source, pumping means, and said indicator means so that either detector can actuate the valve means and thereby control the position of said rams.